Patented Aug. 16, 1949

2,478,944

UNITED STATES PATENT OFFICE 2,478,944

BRAZING FLUX COMPOSITION

Albert E. Rising, Jr., Glen Head, N. Y.

No Drawing. Application June 17, 1946,
Serial No. 677,145

1 Claim. (Cl. 148—26)

(Granted under the act of March 3, 1883, as
amended April 30, 1928; 370 O. G. 757)

This invention relates to flux compositions and more particularly to flux compositions suitable for use in silver brazing or soldering.

The most commonly used fluxes for silver brazing by torch, induction, furnace, resistance or incandescent carbon methods are of the aqueous paste or saturated solution types. Fundamental components of such fluxes are usually boron compounds (e. g. borax or potassium tetraborate), as the main fluxing constituent, and alkali bifluorides as solvent for refractory oxides of chromium. The present invention is concerned with flux compositions of such character.

Silver solders commonly have melting points within the range 1175° to 1500° F. Accordingly, fluxes used therewith should be fluid within this range and should be persistent to the upper limit, as well as possessing the properties of protecting the parts against oxidation and dissolving oxides already formed. It it, therefore, an object of the present invention to provide improved flux compositions of the aqueous paste or saturated solution type and having such characteristics.

Other objects of the invention are to provide improved flux compositions that do not fume at elevated temperatures and that produce slags that are readily soluble in water.

It is known that alkali fluoborates, such as potassium fluoborate ($KBF_4$), are desirable additive constituents in flux compositions of the character referred to, since these compounds have a high capacity for oxide dissolution. Patents 2,174,551 and 2,357,014 are directed to flux compositions containing alkali fluoborates as constituents.

In the flux composition of the present invention, an alkali fluoborate, preferably potassium fluoborate, is combined with potassium tetraborate and potassium bifluoride in certain critical proportions, hereinafter stated. A relatively small amount of boric acid is preferably introduced to improve the molten film persistence.

The operative ranges of proportions of the constituents of the flux composition of the present invention are as follows (by weight):

| | Per cent |
|---|---|
| $K_2B_4O_7.5H_2O$ | 55 to 45 |
| $KHF_2$ | 25 to 35 |
| $KBF_4$ | 17 to 13 |
| $H_3BO_3$ | 4 to 6 |

The limits stated for $KBF_4$ and $H_3BO_3$ are critical as regards the persistence of the molten flux film and the solubility of the frozen slag in water.

The preferred proportions within the operative ranges are approximately as follows:

| | Per cent |
|---|---|
| $K_2B_4O_7.5H_2O$ | 50 |
| $KHF_2$ | 30 |
| $KBF_4$ | 15 |
| $H_3BO_3$ | 5 |

In making the flux composition, the constituents are preferably first separately ball-milled dry and then mixed. The mixture is then preferably mixed with water in the ratio of about 100 grams of the mixture to 75 cc. of water. The resulting paste may then be used as a flux in the known manner. It is obvious, however, that the technique for combining the constituents may be varied and the amount of water added may be changed without departing from the invention.

While I have disclosed but certain compositions and methods of preparation, it is apparent that the compositions and methods may be varied without departing from the spirit of the invention. Therefore, I do not wish to be limited by the disclosure set forth, but only by the scope of the appended claim.

The invention described herein may be manufactured and used by or for the Government of the United States of America for governmental purposes without the payment of any royalties thereon or therefor.

What is claimed is:

A flux having approximately the following composition by weight:

| | Per cent |
|---|---|
| $K_2B_4O_7.5H_2O$ | 50 |
| $KHF_2$ | 30 |
| $KBF_4$ | 15 |
| $H_3BO_3$ | 5 |

ALBERT E. RISING, JR.

REFERENCES CITED

The following references are of record in the file of this patent:

UNITED STATES PATENTS

| Number | Name | Date |
|---|---|---|
| 1,717,250 | Phelan | June 11, 1929 |
| 2,099,582 | Valentine | Nov. 16, 1937 |
| 2,174,551 | Cinamon et al. | Oct. 3, 1939 |
| 2,196,853 | Cinamon et al. | Apr. 9, 1940 |
| 2,267,762 | Streicher | Dec. 30, 1941 |
| 2,322,416 | Coleman et al. | June 22, 1943 |
| 2,344,195 | Anthony et al. | Mar. 14, 1944 |
| 2,357,014 | Merlub-Sobel et al. | Aug. 29, 1945 |

OTHER REFERENCES

Metal Industry, June 1, 1945, pages 346 and 348.

R. Caven and G. Lander: "Systematic Inorganic Chemistry," Blackie and Son Limited, London, 1922, pages 151 and 152.